May 9, 1967  R. T. MAYNARD ETAL  3,319,072
CRYOGENIC COOLING SYSTEM

Filed April 20, 1964

INVENTORS
RALPH T. MAYNARD
CLARENCE J. SCHILLING

BY Ronald B. Sherer

United States Patent Office 3,319,072
Patented May 9, 1967

3,319,072
CRYOGENIC COOLING SYSTEM
Ralph T. Maynard, North Whitehall Township, Lehigh County, and Clarence J. Schilling, Allentown, Pa., assignors to Air Products and Chemicals, Inc., a corporation of Delaware
Filed Apr. 20, 1964, Ser. No. 360,920
9 Claims. (Cl. 290—1)

The present invention relates to improved cryogenic cooling systems of general utility as well as a specific application thereof in connection with traction motors such as those employed to propel diesel-electric locomotives. Although the following disclosure illustrates the invention in this particular environment, it will be readily apparent that the principles of the invention are applicable whenever it is desired to refrigerate a chamber or an element from a mobile refrigeration source.

In designing power plants for vehicles employing traction motors, it is well known that substantial heat losses occur in the motors and that the generated heat must be dissipated at a rate which will prevent damage to any part of the motor. To carry off this heat, a volume of cooling medium must be moved through the motors and, up to now, ambient or compressed air has been the only cooling medium successfully employed in locomotives. The approximate amount of air required for motor ventilation may be calculated from the fact that, at a flow rate of 100 cubic feet of air per minute, the air temperature will rise 18° C. for each kilowatt of heat absorbed.

It is therefore the presently preferred practice to provide traction motors with a forced ventilation cooling system including a blower which forces air through ducts in or on the locomotive bed and through flexible boots to or through the truck center pin and truck frame to the axle hung traction motor where it passes over the surfaces of the rotor and stator of the motor and is then exhausted from the motor to atmosphere. The air entering the blower may be taken from the compartment within the locomotive in which the blower is located, or it may be taken from a central air supply serving all locomative uses.

In view of the overheating problem, traction motors presently have limits of continuous rating which may be defined as the maximum ampere load which can be continuously carried in the motor windings without causing excessive temperature rise in those windings. In addition to the continuous rating, the motors have had what is known as short-time overload ratings which may be defined as the maximum ampere loads which may be carried for a relatively short length of time without damaging the motors. It then follows that the maximum payload which can be moved by an electric motor driven vehicle at a given speed is limited by the continuous or short-time overload rating of the motors.

Because the rise in temperature of the traction motor is brought about by the losses resulting from the conversion of electrical to mechanical energy set forth above, the rise will accelerate as torque increases. This is due to the fact that torque is directly proportional to the current passing through the motor windings and the principal losses are proportional to the square of the electric current. Therefore, the amount of heat to be carried away is proportional to the square of the electric current passing through the motor.

Under normal operating conditions, as for example, when a diesel-electric locomotive is hauling cars on a level track or downgrade, the continuous rating of the motors is not generally exceeded by the demands for power because of limiting conditions not related to the electrical equipment such as speed restrictions and track conditions. Under this type of operation, conventional forced air cooling systems satisfactorily handle the cooling requirements. However, over a given stretch of track the load which a locomotive can haul is limited by what is known as the ruling or steepest grade which it must ascend and it is while ascending this ruling grade that the traction motors are operating at or above their maximum ratings in hauling maximum loads. Thus, if the continuous or short-time overload rating is exceeded for a sufficient period of time, the motors will burn out and this is not an uncommon occurrence.

The problem of traction motor overloading is made even more serious by the fact that new adhesives are currently being developed which will greatly improve the coefficient of friction between locomotive wheels and railroad tracks. The use of these new adhesives in the near future will result in increased hauling power capabilities which, in turn, will provide a need for traction motors having even higher continuous and short-time overload ratings.

It is therefore one object of the present invention to provide an improved cooling system for substantially increasing the continuous and short-time ratings of traction motors whereby the useful tractive effort thereof is substantially increased.

It is a further object of the present invention to provide a new and improved source of mobile refrigeration having general utility which is characterized by substantially increased refrigeration power per unit of refrigerant volume.

The above objects as well as others relating more particularly to detailed advantages of construction and operation will be more fully apparent from the following description when taken with the accompanying drawings, in which.

In brief, the present invention provides one or more detectors for sensing the operating condition of the traction motors and an automatic injection system for dispensing a volatile cryogenic material into the air cooling system whereby the specific and latent heats of the material produce rapid and continued cooling of the motors throughout their peak load operation.

Figure 1:
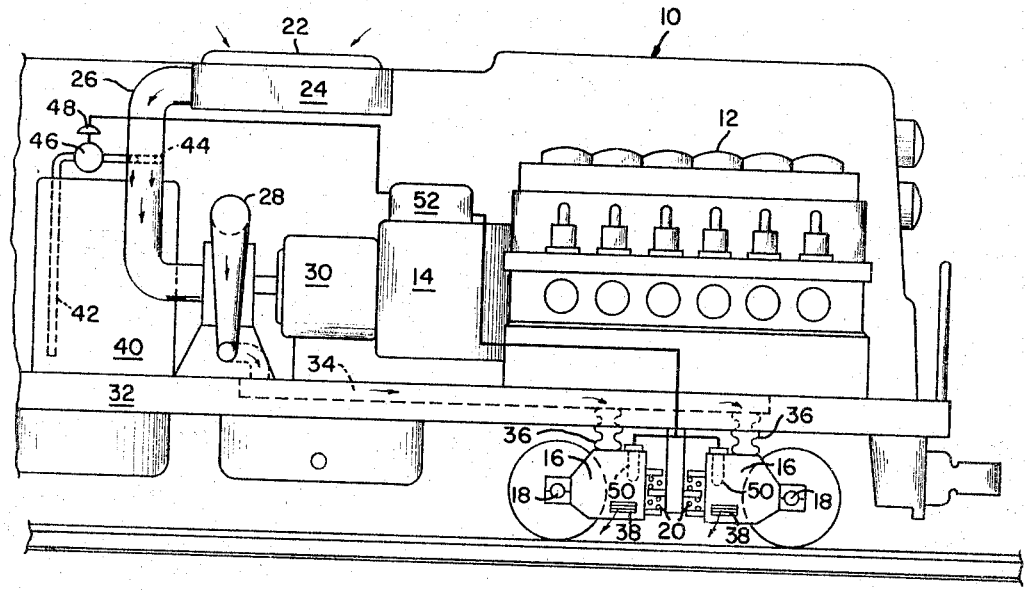
FIGURE 1 is a simplified illustration of a railroad locomotive of the diesel-electric type utilizing one embodiment of the present invention.

Referring first to FIGURE 1, numeral 10 generally designates a locomotive of the diesel-electric type having a diesel engine 12 driving a D.C. generator 14. Power current is supplied through conventional power cables (not shown) to traction motors 16 which are journalled on axles 18 and supported by compression springs 20 in the conventional manner.

FIGURE 1 further illustrates one of many conventional locomotive ventilation systems which normally include an air intake 22, an air filter 24, a conduit 26, and a blower 28 driven by a motor 30, the latter of which receives motive power from generator 14. In the illustrated system, the outlet of blower 28 is ducted through the locomotive platform 32 by a conduit 34 which is connected to the traction motors by individual, flexible conduits or "boots" 36. After flowing through the motors, the air is normally vented to atmosphere through slots or louvers 38.

The structure described thus far is purely conventional although numerous variations are utilized in locomotives built by various manufacturers. For example, some conventional systems take air from within the engine cab and supply it to the motors through the center pins of the trucks. In other systems, air from the blower is passed through the engine cooling section and/or the generator in addition to cooling the traction motors. In still other systems, air from the brake system is used to cool the motors and it is sometimes passed from the motors to heat or cool other locomotive components in series therewith. At this point, it should also be mentioned that some older locomotives employ traction motors having small built-in circulating fans which force air through the motors without the provision of a separate, central blower such as illustrated blower 28. As will subsequently become apparent, the present invention is directly applicable to all of these various types of ventilation systems regardless of the particular details of the air cooling system.

The embodiment of the invention illustrated in FIGURE 1 provides an insulated storage tank 40 which is adapted to contain a cryogenic refrigerant in the form of a liquefied gas such as, for example, liquid nitrogen or liquid air having a temperature in the order of minus 300° F. Of course, other liquefied gases may be employed, however, air and nitrogen are preferred from the economic standpoint. The liquefied gas is preferably carried under slightly superatmospheric pressure although a rather large range of pressures are obviously possible within the scope of the invention. Tank 40 is provided with a liquid outlet pipe 42 one end of which is positioned at the bottom of tank 40 and the opposite end of which terminates in an injection nozzle 44 located in air conduit 26. Nozzle 44 is illustrated as being of annular configuration, however, it will be readily apparent that a linear type spray header may be employed in the alternative. Outlet pipe 42 is provided with a control valve 46 which is operated by a valve actuator 48 the latter of which may be either pneumatically or electrically powered as will be more fully described hereinafter with particular reference to FIGURES 2 and 3. Of course, it will be readily understood that the liquid is forced out of tank 40 by the vapor pressure which is continuously formed at the top of the tank due to boil-off of the liquefied gas and it will be understood that conventional heating coils may be provided for this purpose as is common practice in cryogenic storage tanks. Thus, liquefied gas flows through valve 46 and is injected as liquid into conduit 26 whenever valve 46 is opened by valve actuator 48.

In order to automatically control the operation of valve 46, it is desirable to provide some type of a load sensing control system. Such a control system may take any one of various forms including pneumatic, electric, or combined pneumatic-electric types. For purposes of example, two systems will be described in greater detail.

As broadly illustrated in FIGURE 1, both systems include some type of overload detector such as a temperature sensor 50 located in or adjacent one or more of the motors 16 so as to detect the operating condition of the motors. Of course, it will be readily apparent that other types of detectors are possible within the scope of the invention. For example, a current responsive detector may be applied to the output cables of the generator 14 to detect the occurrence of overload current to the motors, or a torque responsive detector may be applied to the motors for sensing the actual operating load on the motors. In any event, the output of the detectors is fed to a servomotor type controller generally indicated by numeral 52 in FIGURE 1. In turn, the controller feeds a signal indicative of the detected motor conditions to valve actuator 48 which opens, closes, or otherwise changes the modulating position of flow control valve 46.

Figure 2:
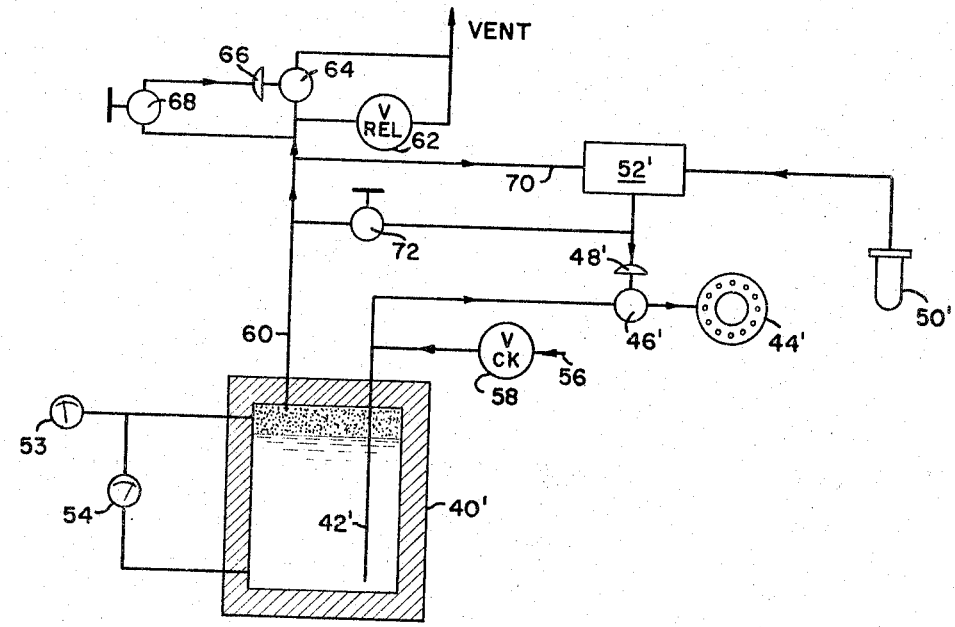
FIGURE 2 is a schematic diagram illustrating a pneumatically controlled embodiment of the present invention.

Referring now to FIGURE 2, a purely pneumatic control system is illustrated as an example of one possible type of automatic system. This system includes an insulated tank 40′ having a vapor pressure gage 53 and a liquid level indicator 54 of the hydrostatic type for indicating the amount of liquefied gas contained in the tank at all times. The system further includes a fill pipe 56 having a check valve 58 to prevent backflow of liquid or vapor. One end of an outlet pipe 42′ extends to the bottom of tank 40′ and the opposite end terminates in a spray nozzle 44′ adapted to be positioned in the blower inlet conduit as previously described. Of course, the location of nozzle 44′ is in no way limited to the blower inlet conduit since it may be positioned anywhere along the air duct system leading to the motors. As a matter of fact, the nozzle can be located immediately upstream or even within the motor casings.

In order to control the vapor pressure within tank 40′ and also utilize the vapor pressure for operating the controller, a vapor line 60 is positioned with one end closely adjacent the top of the tank. Vapor line 60 extends upwardly as viewed on FIGURE 2 and is provided with a pressure relief valve 62 which is set to open only at a predetermined vapor pressure such that sufficient vapor pressure is always present in the top of the tank to force the liquid through outlet pipe 42′, control valve 46′, and nozzle 44′ against the ambient pressure at the selected point of injection.

Vapor line 60 is further provided with a pneumatically operated valve 64 having a diaphragm type valve actuator 66 which is connected through a manual valve 68 to vapor line 60. Valve 64 functions as an auxiliary vent valve, particularly during the filling of tank 40′, so that liquid overflow is safely vented to atmosphere during this operation. In addition, valve 64 functions as a safety valve in the event that relief valve 62 should fail to operate. In either event, manual opening of valve 68 permits vapor pressure to flow into the diaphragm chamber of valve actuator 66 thereby opening valve 64 and venting excessive pressure and/or overflow liquid safely to atmosphere. Of course, it will be undestood that valve actuator 66 is provided with a small bleed passage so that, when the supply of vapor pressure is cut off by closure of valve 68, the pressure in the diaphragm chamber returns to atmospheric pressure whereby valve 64 automatically recloses.

Vapor line 60 is further connected to a conventional pneumatic controller 52′ via line 70 so as to provide pneumatic power to operate valve actuator 48′ controlling the operation of flow control valve 46′. In turn, controller 52′ operates in response to pneumatic signals supplied by one or more of vapor bulbs 50′ located within motors 16 or, alternatively, closely adjacent the outlet slots or louvers 38. Controller 52′ is entirely conventional and operates in the nature of a pneumatic amplifier in controlling the vapor pressure applied to actuator 48′ as a function of the small pneumatic signals received from vapor bulbs 50′.

As a further precaution against operating failure, it is preferred to provide a manual override mechanism so as to control valve 46′ in the event of failure of the vapor bulbs or the controller. This mechanism includes a manually operated control valve 72 which is capable of supplying regulated vapor pressure directly to valve actuator 48′ so as to open valve 46′ in the event of motor overload accompanied by a failure in the control system.

From the foregoing description, it will be readily apparent that flow control valve 46′ can be operated either manually through valve 72 or automatically through bulbs 50′ and controller 52′ so as to modulate the flow of liquefied gas which is injected into the air cooling system as a function of motor operating conditions. As an example of the operating capabilities of the embodiment illustrated in FIGURES 1 through 3, it may be noted that the injection of one pound of liquid air or liquid nitrogen with each 5.5 pounds of air will reduce the air temperature from 100° F. to the order of minus 20° F. Past experience shows that, for example, approximately ten percent increase in motor output power for each 50° F. of cooling can be obtained. Thus, significant economies may be derived from smaller, lighter weight motors, greater operating speeds, and reduction in the size of the required air cooling system since the conventional system need not be designed for overload capacity.

Figure 3:
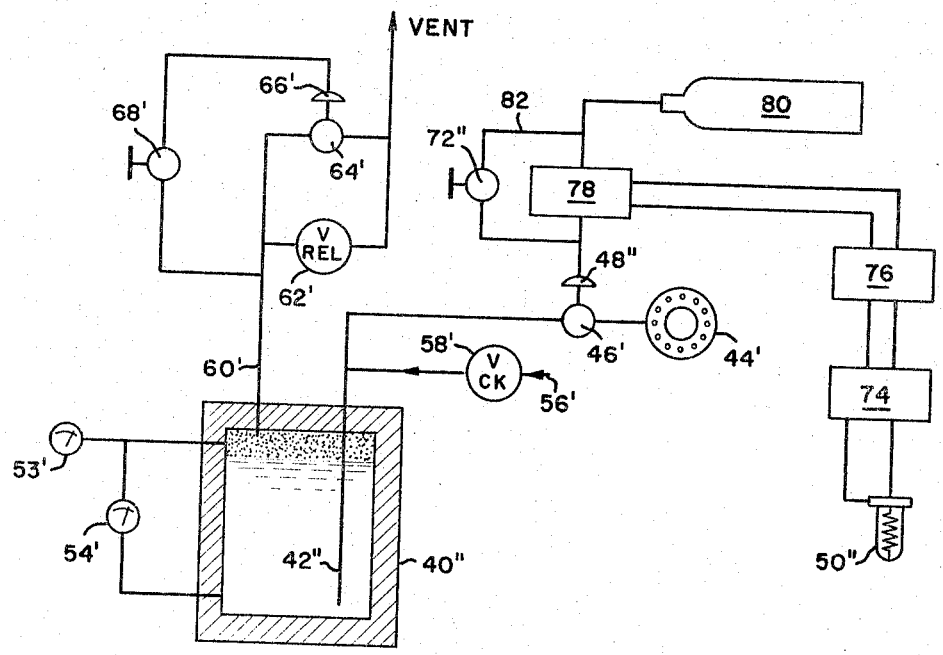
FIGURE 3 is a schematic diagram illustrating a combination electric-pneumatically controlled embodiment of the present invention.

Reference is now made to FIGURE 3 which schematically illustrates a combined electric-pneumatic embodiment of the control system. Those portions of the system which are identical in structure and operation to components previously described in detail are indicated by prime and double numerals and need not be again described in detail. The primary differences in the FIGURE 3 embodiment involve the substitution of a resistance bulb 50″ for vapor bulb 50′ and the substitution of electrical components for pneumatic controller 52′. For example, a transmitting potentiometer 74 is connected between resistance bulb 50″ and a proportional controller 76 so as to send electrical signals to an electro-pneumatic valve positioner 78. The valve positioner is connected to a source of pressurized fluid such as cylinder 80 and regulates the pneumatic pressure supplied to valve actuator 48″ whereby valve 46′ regulates the injection of cryogenic fluid as a function of the electrical signals supplied from resistance bulb 50″.

As in the FIGURE 1 embodiment, it is desirable to provide for manual operation in the event of failure of the automatic system. This is accomplished by providing a bypass line 82 including a manual control valve 72″. Thus, in the event of failure of the automatic system during overload conditions, manual opening of valve 72″ connects actuator 48″ directly to source 80 whereby valve 86′ is opened to permit cryogenic cooling through nozzle 44′.

From the foregoing description it will be readily apparent that the present invention provides automatic cryogenic cooling of the traction motors during peak load conditions whereby significant economies may be achieved through prevention of motor burnout, and substantially increased useful tractive effort. Most importantly, since it is common practice to use more than one diesel-electric locomotive unit to haul long, heavy trains, the use of the present invention will eliminate one or more of these units which are presently required in order to negotiate the ruling grades on a given run. Conversely, it will permit a given number of units to haul a greater trailing load. Thus, the use of the cryogenic cooling need be used only intermittently in this service, or it may be used continuously if so desired.

In the embodiments of the invention described thus far, only the use of cryogenic refrigerant in liquid form has been considered. However, the present invention is in no way limited to liquids and, as will subsequently become apparent, cryogenic refrigerant in solid or mixed phase is preferred from the standpoint of the greatest refrigeration power per unit volume of refrigerant.

Heretofore, solid cryogens such as solid carbon dioxide have been utilized for general refrigeration purposes. However, such solids have been supplied only in the form of large blocks or slabs to be contained in a compartment to be refrigerated. The present invention departs from this practice in providing the solid in the form of snow, flakes, or pellets whereby the solid may be stored in a vessel at one location, such as, for example, on the running board of the locomotive, and conveyed to a remote location in the traction motor ventilation system in a manner similar to that previously described in connection with a cryogenic liquid.

Figures 4, 5:
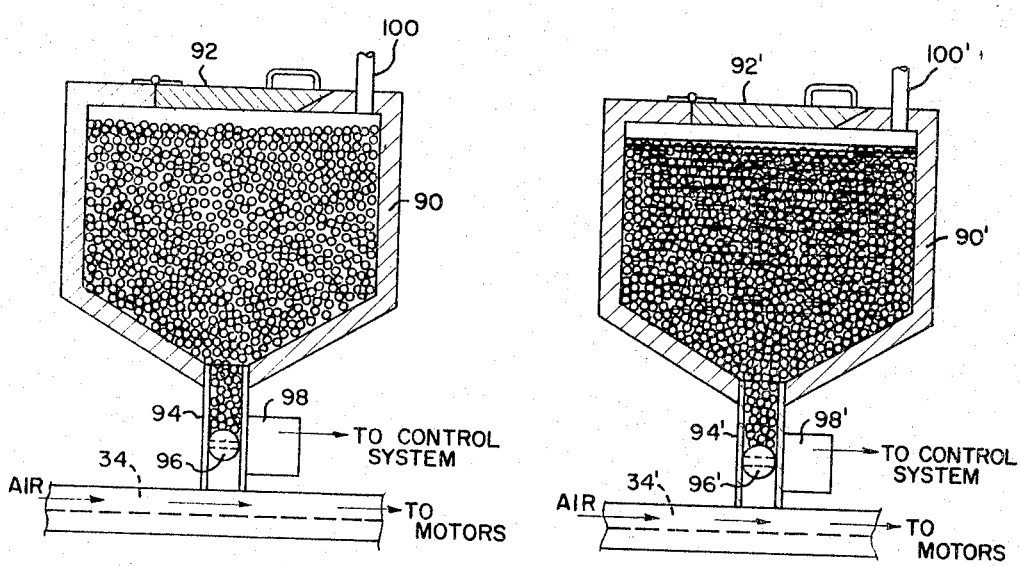
FIGURE 4 is a schematic diagram of a further embodiment of the invention utilizing a solid refrigerant.
FIGURE 5 is a schematic diagram of yet another embodiment of the invention utilizing a solid and liquid mixture as the refrigerant.

Referring now to FIGURE 4, a simplified system is illustrated wherein the solid carbon dioxide in the form of pellets is stored in an insulated tank 90 having a hatch 92 for filling the tank. An outlet conduit 94 connects the bottom of the tank with ventilation duct 34 through which forced air is conveyed to the motors as previously described. A conventional ball or plug type valve 96 is provided in conduit 94 and controlled by an actuator 98 which may be either a solenoid or a pneumatic motor controlled in the same manner as described in connection with FIGURES 2 and 3 hereinabove. Thus, when the detectors 50 sense a motor overload condition, valve 96 is opened whereby the carbon dioxide particles drop into duct 34 either by gravity flow or under a gas pressure supplied to the top of tank 90 by line 100 from a suitable source such as blower 28 or pressurized cylinder 80 as previously described. As a result, the solid carbon dioxide sublimes in duct 34 thereby utilizing both the heat of sublimation and the superheat to subcool the air in the duct. For example, one pound of solid carbon dioxide at a temperature of minus 109° F. will drop the temperature of 9.15 pounds of air in duct 34 from 100° F. to minus 20° F. and thereby result in increasing the useful tractive effort by a factor in the order of twenty percent or more. For a given volume, approximately sixty percent more refrigeration can be obtained from solid carbon dioxide in the form of pellets or snow than can be obtained from liquid nitrogen.

The foregoing description has shown that both solid and liquid cryogenic materials may be employed as mobile refrigeration sources for the specific purpose of substantially increasing the useful tractive effort of traction motors during periods of peak load operation. However, it has also been discovered that an entirely new source of mobile refrigeration is possible having a refrigeration power per unit volume that is about two and one-half times that of liquid nitrogen or about one and one-half times that of solid carbon dioxide as described hereinabove. This increase in stored refrigeration power is made possible by subcooling a solid cryogenic material, such as carbon dioxide, with a second cryogenic material of substantially lower temperature, such as liquid nitrogen, as illustrated in FIGURE 5. For example, tank 90′ is first filled with carbon dioxide pellets at an initial temperature of minus 109° F. as in the case of tank 90. Assuming that the pellets are substantially spherical, they will occupy approximately two-thirds of the tank volume and the remaining one-third is composed of the void spaces between the pellets. Liquid nitrogen at a temperature of minus 320° F. is then poured into the tank to fill the voids between the pellets. Due to the substantial temperature difference between the solid carbon dioxide and the liquid nitrogen, heat transfer immediately takes place therebetween so that the carbon dioxide is subcooled and some of the liquid nitrogen is evaporated. In this process the density of the solid carbon dioxide increases approximately ten percent and its heat capacity increases by about thirty percent. During this process, the vaporized nitrogen is withdrawn from the top of the tank as through vent line 100′ and additional liquid nitrogen is added to the tank through hatch 92′ to replace that which is vaporized. Obviously, the solid and liquid refrigerants can be combined and brought to an equilibrium temperature at a remote manufacturing site wherein the vaporized nitrogen can be recycled through the nitrogen liquefaction plant. As a result, the total stored refrigeration power of a ten-cubic-foot container filled with the subcooled solid carbon dioxide and liquid nitrogen in a two-to-one ratio by volume is in excess of 198,000 B.t.u. which is about two and one-half times the number of B.t.u. of the same container when filled with pure liquid nitrogen.

In use, the solid-liquid mixture operates in the same manner as previously described with reference to FIGURES 1 through 4. That is, the mixture is injected into the motor ventilation system by operation of valve 96′ in response to actuator 98′ which is controlled by a motor load sensing system as previously described. It will also be apparent that air or other cooling media could be passed in direct heat exchange with the refrigerant in tank 90′ and then in heat exchange with the motors or the ventilation ducts instead of employing the direct refrigerant injection as illustrated hereinabove. That is, the present invention encompasses both direct and indirect heat exchange cycles. Of course, the solid-liquid mixture is in no way limited to carbon dioxide and nitrogen since any suitable cryogenic materials may be employed in the same manner so long as the liquid subcools the solid so as to effectively store increased refrigeration power per unit volume of total refrigerant.

It will also be apparent that the above described refrigerant mixture is in no way limited to use in traction motors and that one obvious application is in mobile refrigeration systems such as described in co-pending application Ser. No. 326,889, now Patent Number 3,258,931 wherein refrigeration is employed for the preservation of foods in transit. Similarly, the above described refrigerant may be readily employed in railroad refrigeration cars, refrigeration ships, as well as in stationary frozen food processing and cooling plants. Furthermore, insofar as traction motor cooling is concerned, it will be readily apparent that numerous variations of the cryogenic cooling system will become obvious to those skilled in the art after reading the preceding description of the preferred embodiments. For example, resistance windings may be built into the traction motors in place of separate vapor or resistance bulbs. Similarly valve 46 may be operated by a solenoid in a purely electrical system. Therefore, it is to be understood that the foregoing description is purely illustrative of the principles of the invention and that the true invention is not to be limited other than as set forth in the following claims including all patentable equivalents thereof.

What is claimed is:

1. The method of operating a vehicle including traction motors and an air cooling system comprising the steps of:
   (a) detecting at least one operating parameter indicative of the load conditions of said motors;
   (b) conducting cooling air through said cooling system to said motors so long as the detected load conditions do not exceed predetermined values; and
   (c) conducting a cryogenic refrigerant at a temperature below minus 100° F. into heat exchange relationship with said motors when the detected load conditions exceed said predetermined values.

2. The method as claimed in claim 1 wherein the step of supplying said cryogenic refrigerant into heat exchange relationship with said motors comprises injecting said cryogenic refrigerant directly into said air cooling system.

3. The method as claimed in claim 1 wherein said cryogenic refrigerant is a mixture of solid carbon dioxide and a liquid having a normal boiling point below the sublimation point of the solid carbon dioxide.

4. The method as claimed in claim 1 wherein said cryogenic refrigerant is a mixture of solid carbon dioxide and liquefied nitrogen in thermal equilibrium wherein the solid carbon dioxide is substantially subcooled to approximately minus 320° F.

5. In combination, a vehicle including traction motors and means for supplying cooling air to said motors, a source of cryogenic refrigerant having a temperature below minus 100° F., means for detecting the operating load conditions of said motors, and means for conducting some of said cryogenic refrigerant into heat exchange relationship with said traction motors when said detecting means indicate load conditions exceeding predetermined values.

6. The combination as claimed in claim 5 wherein said last-recited means include means for injecting the cryogenic refrigerant directly into said air supply means.

7. The combination as claimed in claim 5 including control means operatively connected to said detecting means for conducting the cryogenic refrigerant into said heat exchange relationship in response to the detected load conditions of said motors.

8. The combination as claimed in claim 5 wherein: said vehicle comprises a locomotive, said cooling air supply means comprise a forced air circulation system including air ducts leading to said motors, said refrigerant conducting means include means for injecting said refrigerant into said air ducts, and said detecting means comprise temperature sensing means.

9. The combination as claimed in claim 5 wherein: said cryogenic refrigerant comprises a mixture of solid carbon dioxide and liquid having a normal boiling point below the sublimation point of the solid carbon dioxide.

References Cited by the Examiner

UNITED STATES PATENTS

| | | | |
|---|---|---|---|
| 2,445,294 | 7/1948 | Nelson | 62—384 X |
| 2,604,500 | 7/1952 | Koning | 310—52 |
| 2,901,892 | 9/1959 | Woods | 62—384 X |
| 2,919,862 | 1/1960 | Beike et al. | 62—64 |
| 2,951,351 | 9/1960 | Snelling | 62—64 |
| 2,975,308 | 3/1961 | Kilbourne | 310—54 |
| 3,116,700 | 1/1964 | Aydelott | 105—59 |

FOREIGN PATENTS

| | | |
|---|---|---|
| 515,033 | 11/1920 | France. |
| 319,707 | 12/1930 | Great Britain. |

ORIS L. RADER, *Primary Examiner.*

G. SIMMONS, *Assistant Examiner.*